(12) United States Patent
Nishimura et al.

(10) Patent No.: US 6,499,315 B1
(45) Date of Patent: Dec. 31, 2002

(54) PRODUCTION METHOD FOR MAKING AN OPTICAL MEMBER FOR EXCIMER LASER USING SYNTHETIC QUARTZ GLASS

(75) Inventors: Hiroyuki Nishimura, Koriyama (JP); Akira Fujinoki, Koriyama (JP); Hisatoshi Otsuka, Kubiki-mura (JP)

(73) Assignees: Shin-Etsu Quartz Products Co., Ltd, Tokyo (JP); Shin-Etsu Chemical Co., Ltd., Tokyo (JP)

( * ) Notice: Subject to any disclaimer, the term of this patent is extended or adjusted under 35 U.S.C. 154(b) by 0 days.

(21) Appl. No.: 09/671,202

(22) Filed: Sep. 28, 2000

Related U.S. Application Data

(62) Division of application No. 09/035,752, filed on Mar. 6, 1998, now abandoned.

(30) Foreign Application Priority Data

Apr. 8, 1997  (JP) ............................................. 9-105212

(51) Int. Cl.⁷ ............................................... C03B 20/00
(52) U.S. Cl. ........................... 65/17.4; 65/21.1; 65/413; 501/54
(58) Field of Search ........................ 65/413, 17.4, 21.1; 501/54

(56) References Cited

U.S. PATENT DOCUMENTS

| | | | |
|---|---|---|---|
| 5,152,819 A | * 10/1992 | Blackwell et al. | 423/336 |
| 5,616,159 A |   4/1997 | Araujo et al. | |
| 5,707,908 A |   1/1998 | Komine et al. | |
| 5,735,921 A | *  4/1998 | Araujo et al. | 65/32.1 |
| 5,876,683 A | *  3/1999 | Glumac | |
| 5,896,222 A |   4/1999 | Rosplock et al. | |
| 5,958,809 A |   9/1999 | Fujiwara et al. | |
| 6,309,991 B1 | * 10/2001 | Borrelli et al. | 430/5 |

FOREIGN PATENT DOCUMENTS

| | | |
|---|---|---|
| EP | 0299754 A2 | 1/1989 |
| EP | 0525984 B1 | 6/1992 |
| EP | 0529189 A2 | 3/1993 |
| EP | 0747327 A1 | 12/1996 |
| JP | 06199531 A | 7/1994 |
| JP | 06287022 A | 10/1994 |
| JP | 07061823 A | 3/1995 |
| JP | 7-300325 | 11/1995 |
| JP | 8-081225 | 3/1996 |
| JP | 9-002828 | 1/1997 |

* cited by examiner

*Primary Examiner*—John Hoffmann
(74) *Attorney, Agent, or Firm*—Finnegan, Henderson, Farabow, Garrett, & Dunner LLP

(57) ABSTRACT

The present invention relates to a synthetic quartz glass, which is a material for producing an optical member having an excellent excimer laser resistance, and a production method thereof with a good productivity. That is, the synthetic quartz glass produced by vitrifying glass fine particles obtained by flame hydrolysis of an organodisilazane compound directly on a substrate having a birefringence index of 5 nm/cm or less, a refractive index difference ($\Delta n$) of $2\times10^{-6}$/cm or less, and an ArF saturated absorbance of 0.05/cm or less at a pulse energy density of 100 mJ/cm²/pulse. The production method thereof comprises the steps of introducing an organodisilazane compound represented by a general formula 1:

$$(R^1)_3SiNHSi(R^2)_3 \tag{1}$$

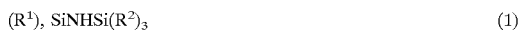

wherein $R^1$ and $R^2$ represent the same or a different alkyl group having 1 to 3 carbon atoms, into a flame comprising a combustion gas and a combustion-supporting gas to generate silica fine particles, and accumulating the silica fine particles on a rotating heat resistant substrate to be a molten glass.

6 Claims, 2 Drawing Sheets

PRODUCTION METHOD FOR MAKING AN OPTICAL MEMBER FOR EXCIMER LASER USING SYNTHETIC QUARTZ GLASS

This is a division of application Ser. No. 09/035,752, filed Mar. 6, 1998 abandoned.

BACKGROUND OF THE INVENTION

1. Field of the Invention

The present invention relates to an optical synthetic quartz glass having excellent light transmissivity, optical homogeneity, and optical stability with respect to the ultraviolet ray irradiation, particularly to the excimer laser irradiation, which is an ultraviolet ray laser, a production method thereof, and an optical member for an excimer laser using the synthetic optical glass.

2. Description of the Related Art

With a higher integration degree of the LSI, processing accuracy of the sub-micron order is required in the photolithography for drawing an integrated circuit pattern on a silicon wafer. Therefore, an exposing device for drawing a circuit pattern is also improved. For example, a finer line width in drawing is achieved by a shorter wavelength of the power source of the exposing device or adopting the resolution enhancement techniques using interference of light. That is, the light source has a short wavelength between the g ray (wavelength 436 nm) to the i ray (wavelength 365 nm) of a mercury lamp, and the exposing device of the diffraction system adopts resolution enhancement techniquies utilizing the interference of light, such as a off-axis illumination method or a phase shift mask method. The demand for finer drawing is accelerated these days so that an excimer laser having a shorter wavelength is used in place of the mercury lamp. Examples of the excimer laser include a KrF laser (wavelength 248 nm) and an ArF laser (wavelength 193 nm). Owing to the use of the excimer laser as the light source, a higher quality is required for optical members including a lens used in the exposing device. For example, if the light transmissivity is poor, the focal length of the lens or the other characteristics suffer adverse effects by the heat generation of the lens due to the light absorption, or if the optical homogeneity is poor, problems such as deterioration of the image formation characteristics are involved.

Conventionally, an optical synthetic quartz glass is used as the material of the optical members for an exposing device for drawing a circuit pattern by a photolithography. The synthetic quartz glass can be produced in the direct method where a vapor of a highly pure silicon compound such as silicon tetrachloride ($SiCl_4$) is introduced directly to the oxygen-hydrogen flame and glass fine particles obtained by the flame hydrolysis are deposited on a heat resistant substrate to be a molten glass for obtaining a transparent glass or in the soot method where the glass fine particles are deposited on a heat resistant substrate as a porous material and heated in an electric furnace to be a molten glass. In either case, by the use of a highly pure material, the transmissivity in the ultraviolet ray region is improved as well as the optical homogeneity can be maintained. In the case of an optical material made from the above-mentioned synthetic quartz glass, damage caused by the light did not have to be considered if the i ray of the mercury lamp is used as the light source of the exposing device, however, it should be dealt with if the excimer laser is used instead. The problem is derived from the pulse energy per one shot of the excimer laser, which is a pulse laser, is extremely large compared with a continuous light source such as the i ray (mercury lamp, CW laser, etc.). Damage caused by the excimer laser on a synthetic quartz glass may differ remarkably depending on the production method or the production conditions thereof. The damage refers to the deterioration of the laser transmissivity caused by the absorption in the ultraviolet region by the ultraviolet ray laser irradiation and the rise of the refractive index caused by the permanent compaction (contraction of the glass). The insusceptibility to the damage is called the laser resistance. As mentioned above, the absorption in the ultraviolet region occurs subject to the damage. This is considered to be because of the paramagnetic defect derived from the intrinsic defect in the quartz glass by the light reaction. The existence of the paramagnetic defect derived from the laser has been observed and identified by the ESR spectrum. As examples thereof, the structures such as El center (Si.) and NBOHC (Si—O.) are known. Such a paramagnetic defect, in general, has an; absorption band. For example, E' center has it at 215 nm. Furthermore, although the species of the defect has not been identified yet, absorption is observed also at 260 nm subject to the excimer laser irradiation. These absorption bands can be comparatively broad and strong. For example, in the case of the use as the light transmissive material for a KrF laser (wavelength 248 nm) or an ArF laser (wavelength 193 nm), deterioration in the laser transmissivity caused thereby poses a serious problem. In addition to the absorption in the ultraviolet region, a permanent compaction occurs. The compaction is derived from the transition to a more stable structure in a part of the quartz glass due to the atom recombination subject to a strong laser energy irradiation. Accordingly, the density in the irradiated portion heightens to raise the refractive index of the quartz glass material, resulting in a major influence on the image formation characteristics. Furthermore, due to the local density rise in the laser-irradiated portion, the stress is generated at the interface between the non-irradiated portion and the irradiated portion with the distortion so as to raise the birefringence index and affect the optical characteristics.

Various methods have been proposed in order to solve the above-mentioned problems. Example thereof include a method of having particular production conditions of a quartz glass, and a method of applying a heat treatment to a produced synthetic quartz glass in a particular atmosphere. As an example of the former method, Japanese Unexamined Patent Publication Nos. 6-199531 and 6-287022 disclose a production method with a hydrogen-excessive condition, paying attention to the gas balance in the synthetic quartz glass production. By having the hydrogen molecules dissolved as mentioned above, the paramagnetic defect caused by the laser irradiation can be compensated by the hydrogen molecules so that the generation of the paramagnetic defect can be restrained and thus the laser transmissivity can be ensured without generating an absorption band in the ultraviolet ray region. In the method of dissolving hydrogen molecules, the laser resistance improves with a larger amount of dissolved hydrogen molecules in producing a synthetic quartz glass. However, since the amount of the hydrogen molecules to be dissolved remarkably varies according to not only the gas amount of a combustion gas and a combustion-supporting gas but the surface temperature or the surface area of the substrate to be deposited during the growth in the direct method, it is difficult to control the factor. Therefore, hydrogen molecules dissolved more than intended may result in a strongly reducing property to generate an oxygen lacking defect or a reduced species of silicon atoms (=Si:), which provides a precursor of the paramagnetic defect and deteriorates the laser resistance. Although the above-mentioned method of dissolving hydrogen molecules is advantageous in terms of the improvement of the laser resistance, with the laser irradiation for a very long time to the synthetic quartz glass having hydrogen molecules dissolved, the ultraviolet ray absorption occurs due to the dissolved hydrogen molecule consumption. Since the absorption is derived from the paramagnetic defect, a production method of a quartz glass for minimizing the paramagnetic defect structure is discussed. Examples of structures to cause the paramagnetic defect include (i) one derived from a glass structure, such as an unstable $SiO_2$ network portion, (ii) an unordered structure generated from the deviation in the stoichiometric ratio, such as Si—Si and Si—O—O—Si, (iii) a structure excluding silica, such as SiCl and SiOH, and (iv) an unordered structure derived from a metal impurity. Japanese Unexamined Patent Publication No. 7-61823 discloses a production method of a synthetic quartz glass with little amount of such a structure. The method is to have the growth ratio of a quartz glass ingot to be 2 mm/hour or less. However, since the glass growth rate is too low, it results in a poor productivity and a high production cost. Furthermore, the conventional synthetic quartz glass may generate a paramagnetic defect based on SiCl. In the conventional production method of a synthetic quartz glass, since silicon tetrachloride is used basically as the material, and silica fine particles are generated by the hydrolysis reaction thereof in an oxygen-hydrogen flame to have a molten glass, unreacted SiCl remains. The residual amount of SiCl varies depending upon the oxygen-hydrogen flame conditions, and the temperature in the growths surface, that is, the depositing and melting conditions. In general, it remains about 10 to 150 ppm and it is difficult to have its concentration less than the detection limit. In addition to the residual SiCl, in the conventional production method of a synthetic quartz glass, a hydrogen chloride gas is generated in the production. Since the hydrogen chloride gas is hazardous, it should be eliminated. Besides, since it erodes the device, an erode prevention means needs to be provided, and thus the necessity soared the production cost.

On the other hand, optical members used in the exposing device with a photolithography technique, such as a lens and a prism need to have the laser resistance. In addition, it is also important to have excellent light transmissivity, optical homogeneity without generation of fluorescence, bubbles, or distortion, or inclusion of a foreign matter. Regarding the optical homogeneity, it is required even for a member larger than a 200 mm diameter size not to have a stria, and to have a refractive index difference ($\Delta n$) of $2 \times 10^{-6}$ or less. In general, in a production method of a synthetic quartz glass with a single burner, a material is introduced from one direction onto a rotating target with an oxygen-hydrogen flame blown so as to deposit and melt silica fine particles and thus a temperature distribution is generated on the growth surface. That is, a portion where directly applied with the flame has a relatively high temperature, but on the other hand, a portion on the opposite side has a relatively low temperature. Since the target is rotated with a predetermined rotation frequency, a certain portion has a temperature change as time passes with a cycle of a high temperature and a low temperature successively alternated according to the rotation frequency of the target. Glass is deposited and grows on the rotation axis accordingly. If silica fine particles of a high temperature are blown to a portion having a low temperature and re-melted, the interface is not homogeneous but the density and physical properties differ thereat from the microscopic viewpoint so that the interface is observed as the stria like a layer along the rotation axis direction. In order to restrain the stria generation, the production conditions need to be improved. As a method therefor, (A) to have the temperature distribution in the growth surface homogeneous, (B) to maximize the temperature in the growth surface, and (C) to minimize the amount of attached silica fine particles per one rotation of the target can be presented. In the direct method using one burner, it is difficult to have the temperature distribution in the growth surface homogeneous. Therefore, a method of surrounding the growth surface with a heat resistant container to seal the heat has been proposed. However, the method has a disadvantage in that the flame is disturbed and thus a stable continuous growth cannot be conducted. Furthermore, in the method of maximizing the growth surface, with an excessively high temperature, the viscosity of a quartz glass becomes too low to keep the shape of the growth surface and the shape differs in the distance from the burner to the target to cause an irregular quality. In the worst case, a continuous growth cannot be conducted. Besides, since a noncombustible silicon compound such as silicon tetrachloride is used as the material in the conventional production method of a synthetic quartz glass, the frame temperature of the burner tends to be lower and thus it is difficult to maintain the temperature of the silica fine particle growth surface at a high level. Therefore, a large amount of a combustion gas needs to be introduced to the burner. It results in a higher gas flowing rate of the burner to dent a portion which is applied to the flame of the burner directly to cause the growth surface shape change. As a result, generation of a stria becomes more liable.

In consideration of the problems of the conventional production methods of a synthetic quartz glass, the present inventors have studied elaborately to find out that a synthetic quartz glass having excellent light transmissivity and optical homogeneity and a high laser resistance can be produced with a high productivity by using an organosilazane compound as the material and introducing it into a flame comprising a combustion gas and a combustion-supporting gas to generate silica fine particles, and depositing the silica fine particles onto a rotating heat resistant substrate to be a molten glass, and completed the present invention.

A synthetic quartz glass of the present invention is excellent in terms of the excimer laser resistance, in particular, the ArF laser resistance. The synthetic quartz glass is advantageous as an optical member, such as a lens, a prism, and a beam slitter for an exposing device for a stepper having an excimer laser as the light source.

SUMMARY OF THE INVENTION

An object of the present invention is to provide an optical synthetic quartz glass, having excellent light transmissivity and optical homogeneity and a high excimer laser resistance.

Another object of the present invention is to provide an optical synthetic quartz glass having excellent laser transmissivity and optical homogeneity and a high ArF laser resistance.

Yet another object of the present invention is to provide a production method of the synthetic quartz glass.

Still another object of the present invention is to provide an optical quartz glass member having a high excimer laser resistance, using the synthetic quartz glass.

DESCRIPTION OF THE PREFERRED EMBODIMENTS

Figure 1:
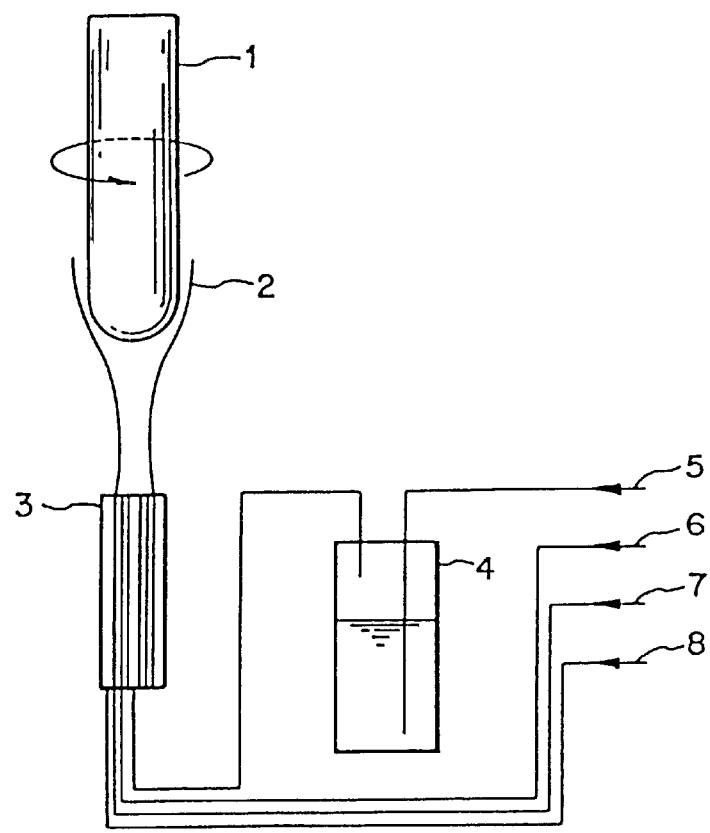
FIG. 1 is a schematic diagram showing a production method of the present invention.

In order to achieve the above-mentioned objects, the present invention relates to an optical synthetic quartz glass having an excellent excimer laser resistance and a high light transmissivity produced by vitrifying glass fine particles obtained by flame hydrolysis of an organodisilazane compound directly on a substrate having a birefringence index of 5 nm/cm or less, a refractive index difference (Δn) of $2 \times 10^{-6}$/cm or less, and an ArF saturated absorbance of 0.05 /cm or less at a pulse energy density of 100 mJ/cm$^2$/pulse and a production method thereof, and an optical member obtained by processing the synthetic quartz glass.

Since a synthetic quartz glass of the present invention has a birefringence index of 5 nm/cm or less and a refractive index difference (Δn) of $2 \times 10^{-6}$ or less, and thus does not have a distortion, and is homogeneous without having a stria, it can provide a good image formation characteristic of an excimer laser without affecting the focal length. Furthermore, since an ArF saturated absorbance is 0.05 /cm or less at a pulse energy density of 100 mJ/cm$^2$/pulse and thus the number of unordered structures in the synthetic quartz glass is small, the excimer laser resistance for KrF, ArF, etc. is high. Therefore, an optical member formed therewith is advantageous as a lens, a prism, or a beam slitter for an exposing device for a stepper having a KrF or ArF examiner laser as the light source. In particular, a synthetic quartz glass having a hydrogen molecule content of $5 \times 10^{16}$ molecular number/cm$^3$ or more shows an excellent laser resistance with respect to an ArF excimer laser.

The above-mentioned synthetic quartz glass of the present invention can be produced by introducing an organodisilazane compound represented by a general formula 1:

$$(R^1)_3 \text{SiNHSi} (R^2)_3 \qquad (1)$$

wherein R$^1$ and R$^2$ represent the same or a different alkyl group having 1 to 3 carbon atoms, into a flame comprising a combustion gas and a combustion-supporting gas to generate silica fine particles, and depositing the silica fine particles on a rotating heat resistant substrate to be a molten glass. Particularly preferable is a production method according to the direct method, which is one of conventional production methods of a synthetic quartz glass, where silica fine particles generated by introducing a material mixed with a carrier gas into a flame comprising a combustion-supporting gas are blown and deposited onto a rotating heat resistant substrate to be a molten glass.

Examples of organodisilazane compounds represented by the above-mentioned general formula 1 include hexamethyl disilazane, hexaethyl disilazane, and hexapropyl disilazane. In particular, hexamethyl disilazane and hexaethyl disilazane are preferable. Since the organodisilizane compounds are made from a material having two silicon atoms in a molecule, silica can be generated by a double molar number per one molar material, a double growth rate can be achieved by the same injection amount with respect to a conventional production method using silicon tetrachloride as the material. Therefore, the material gas flow rate to be injected can be lowered to have the gas flow rate blown onto the growth surface can be smaller without declining the growth rate of the quartz glass so that a high temperature can be maintained without deformation of the growth surface. As a result, the unordered structure in the quartz glass can be maintained at a sufficiently low level so that a highly homogeneous quartz glass without a stria, having an improved laser resistance can be produced. The excimer laser resistance can be further improved by dissolving hydrogen molecules in the quartz glass having a sufficiently low level of unordered structures as mentioned above in a range of $5 \times 10^{16}$ (molecular number/cm$^3$) or more. Examples of methods for containing hydrogen molecules in the above-mentioned range include a method of setting a hydrogen gas amount with respect to oxygen gas supplied to a burner at a level larger than the stoichiometric ratio, and a method of applying a heat treatment to the produced synthetic quartz glass in a hydrogen atmosphere as disclosed in Japanese Unexamined Patent Publication Nos. 2-64645 and 6-287022. Particularly in the case of producing a high quality synthetic quartz glass with little amount of structures to cause a paramagnetic defect, it is effective to have a thin growth layer of the quartz glass. Therefore, it is preferable to have the material with respect to the fuel gas amount by the molar ratio of 0.01 or less, more preferably from 0.001 to 0.01, or to have the rotation rate of the rotating heat resistant substrate of 10 to 150 rpm, or combining both thereof. With a molar ratio exceeding 0.01, the amount of unordered structure cannot be reduced sufficiently. With a rotation rate of the substrate of less than 10 rpm, unordered structures cannot be eliminated sufficiently, on the other hand, with a rotation rate of the substrate exceeding 150 rpm, the shape of the quartz glass ingot becomes unstable, and thus neither is not preferable. As a burner for forming a flame used in the production method, a multiple tube burner can be preferably used. In particular, a burner with at least triple tube is preferable. When the multiple tube burner is used, an organodisilazane compound is introduced from the innermost burner with a carrier gas, and a combustion-supporting gas and a combustion gas are introduced in the outer layers, respectively. Since a glass may deposit at the tip of the nozzle of the burner in the case the supply rate of the organodisilazane compound material is low, it is preferable to provide a port for supplying a seal gas comprising an inert gas between a material supply port and a combustion-supporting gas port so as to supply the seal gas while the material gas is supplied to the burner. Examples of the carrier gas include a nitrogen gas, an argon gas, and a helium gas. Examples of the combustion gas include hydrogen, methane, ethane and propane. Examples of the combustion-supporting gas include an oxygen gas and a gas mixture of an oxygen gas and a nitrogen gas.

The production method of the present invention will be explained with reference to drawings. Numerals in FIG. 1 represent the following elements: 1 heat resistance substrate, 2 flame, 3 multiple tube burner, 4 material bubbling device, 5 carrier gas introduction opening, 6 seal gas introduction opening, 7 combustion-supporting gas introduction opening, and 8 combustion gas introduction opening. The material vaporized and mixed with a carrier gas by the bubbling device is introduced to the central port of the multiple tube burner. On the other hand, the combustion gas and the combustion-supporting gas are supplied to the burner from the respective gas introduction opening and burned. The material gas introduced into the flame comprising the combustion gas and the combustion-supporting gas is oxidized to become silica fine particles and deposited on a rotating heat resistant substrate. At the same time, it becomes a molten glass to form a bar-like quartz glass. The burner can be arranged such that the flame is directed to the lower oblique direction with respect to the heat resistance substrate, or to the lower tip of the target, however, in order to maintain the distance between the target and the burner constantly, it is preferable that the rotation axis direction of the target can be moved synchronously with the growth rate of the quartz glass. The flow rate of the carrier gas is adjusted by a needle valve and an ordinary floating type flow meter. But it is more preferable to control accurately with a mass flow controller.

Embodiments of the present invention will be described hereinafter, but the present invention is not limited thereto.

The following measuring methods were used to measure values in Examples and Comparative Examples hereinafter.

i) Laser Transmissivity

A sample was irradiated with an ArF excimer laser light (193 nm) having a pulse energy density of 100 mJ/cm$^2$/pulse, and a repeating frequency of 100 Hz. The reflected light intensity from the sample was measured with detectors (12), (14). With the reflected light intensity on the input side ($I_{in}$) and the reflected light intensity on the output side ($I_{out}$), the laser transmissivity (T) can be calculated by the below-mentioned formula (1);

$$T = \gamma I_{in}/I_{out} \qquad (1)$$

wherein $\gamma$ represents a correction coefficient, which is a value of $I_{in}/I_{out}$ without a sample.

Figure 2:
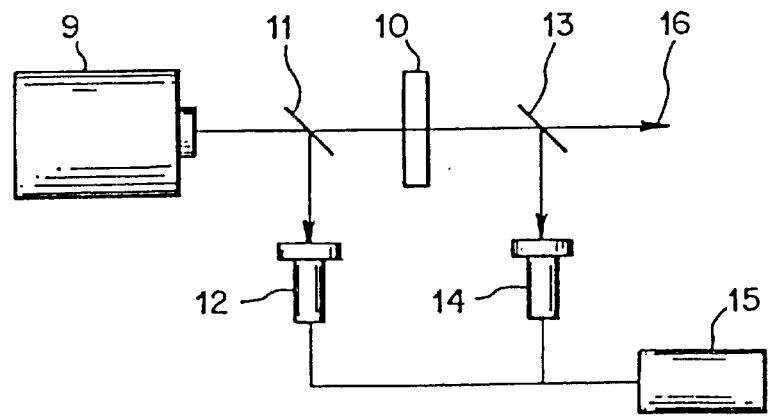
FIG. 2 is a schematic diagram showing the method for measuring the laser transmissivity (T).

A device shown in FIG. 2 was used for measuring the laser transmissivity. Numerals in FIG. 2 represent the following elements: 9 excimer laser, 10 sample, 11 input side beam slitter, 12 input side energy meter, 13 output side beam slitter, 14 output side energy meter, 15 data processing computer, and 16 excimer laser light.

ii) Absorbance:

The absorbance per a unit optical path length (cm) was calculated by the following formula (2);

$$\text{Absorbance} = (-\log(T)/\text{laser optical path length passing through the sample (cm)}) \qquad (2)$$

Figure 3:
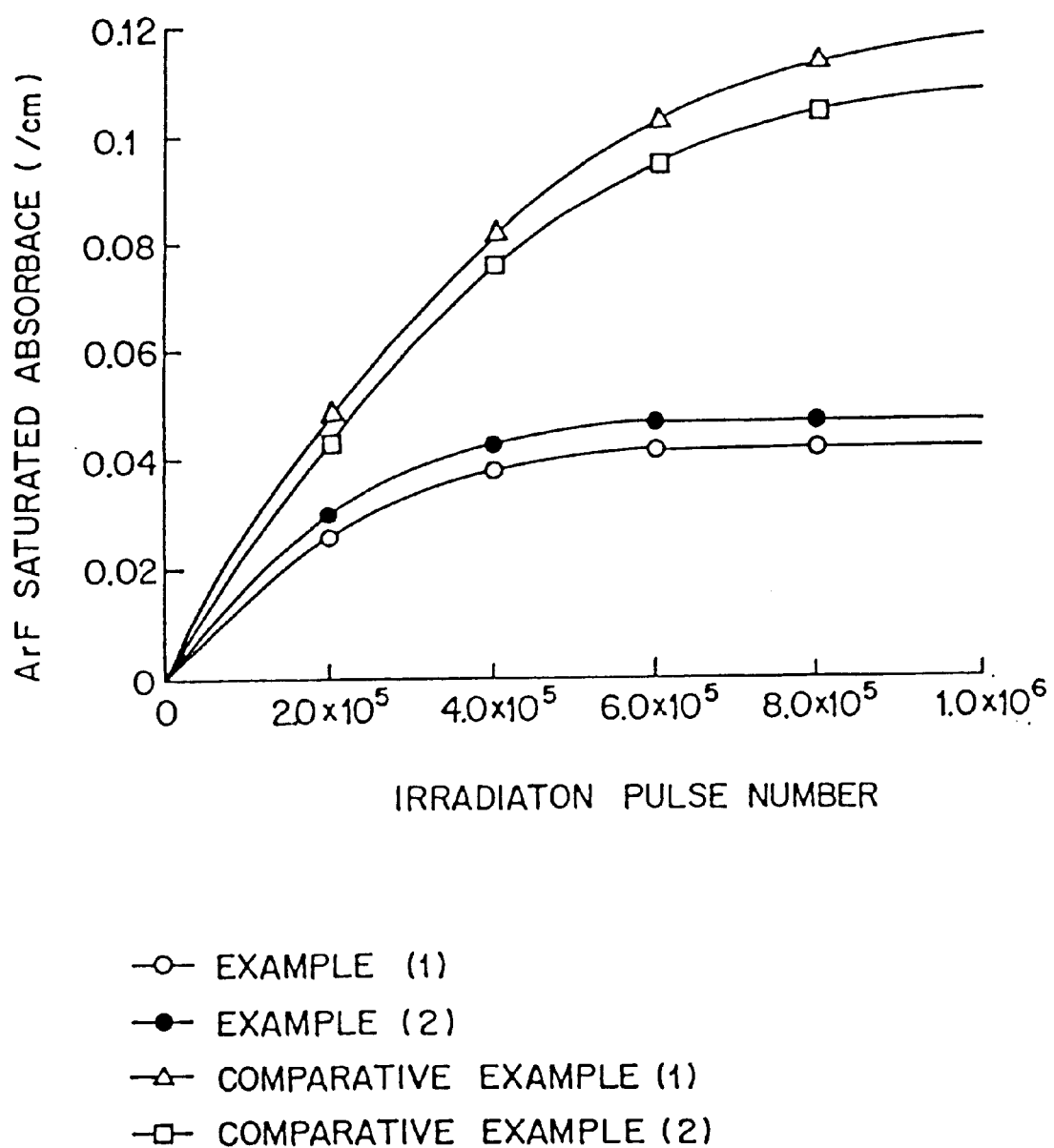
FIG. 3 is a graph showing the change of the laser transmissivity by the ArF laser irradiation.

In the formula, T represents the laser transmissivity calculated by the formula (1). In this experiment, the sample is evaluated for 1 cm optical path length. In general, for essential evaluation of the laser resistance of silica glass, the contained hydrogen gas needs to be completely degassed. Because dissolved hydrogen molecules have an effect of improving the laser resstance, it is necessary to irradiate a laser beam in the completely degassed state in order to evaluate the intrinsic laser resistance of the silica glass itself. By the ArF laser irradiation to quartz glass not containing hydrogen, in general, the laser transmissivity is deteriorated due to the absorption induced by the laser irradiation. FIG. 3 is a graph where the change amount of the absorbance calculated by the above-mentioned formula (2) is plotted according to the laser irradiation. Since a measuring device measures the laser irradiation light directly, the absorbance at the irradiation number 0 pulse cannot be calculated by the formula (2) in principle so that the absorbance from the irradiation one to several tens pulses is substituted for the value of the irradiation number 0 pulse. With the irradiation condition with the energy density of about 100 mJ/cm$^2$p, substantially no difference can be observed even if the absorbance calculated with a laser light beam from the start of the laser irradiation to about several pulses is used substituted for the absorbance of the irradiation number 0. A value calculated with the transmissivity in a laser light beam of 193.4 nm can also be used as an initial value. The transmissivity is measured with other measuring devices, for example, an ultra-violet spectrophotometer. Since the induced absorption increases according to the increase of the laser irradiation number, the value of the absorbance in the formula (2) becomes larger as well. The vertical axis in FIG. 3 represents the value obtained bu substracting the absorbance value of each pulse number from the absorbance value at the irradiation number 0 (the above-mentioned substitute value), that is, the change amount of the absorbance from the initial irradiation stage. The change amount of the absorbance, that is, the absorbance amount induced by the laser irradiation is saturated at a certain point. In this evaluation, the change amount of the absorbance with the irradiation energy density per one pulse of 100 mJ/cm$^2$/p and the frequency of 100 Hz is shown in FIG. 3. The laser resistance of quartz glass is evaluated by the change amount where the absorbance change is saturated, which is defined to be the saturated absorbance.

iii) Stria

Striae were inspected visually with a crossed nicols polarized plate.

iv) Homogeneity

The homogeneity was evaluated by measuring the refractive index difference with a He-Ne laser wavelength (632.8 nm).

v) Measurement of Hydrogen Molecules

Hydrogen molecules were measured with a laser Raman scattering spectroscopy (V. S. Khotomchenko et al., J. Appl. Spectroosec., 46, 632–635 (1987)).

EXAMPLE 1

The temperature of a hexamethyl disilazane liquid (specific gravity 0.774) in the bubbling device in FIG. 1 was set to be 70° C., and an argon carrier gas was introduced thereto at 0.18 Nm$^3$/hr. With the material supply rate of 500 g/hr, a hexamethyl disilazane gas was introduced to the burner. An oxygen gas and a hydrogen gas were also supplied to the burner with-the flow rate ratio of:0.44, so as to have a quartz glass grow on a target at the growth rate of about 170 g/hr. In about 60 hours, a bar-like quartz glass ingot with a 120 mm diameter and a 400 mm length was produced. During the quartz glass growth, shape change or growth surface dent was not observed. The hydrogen molecule concentration at the center part of the obtained ingot was 4.5×10$^{18}$ (molecular number/cm$^3$). The ingot was applied with a heat treatment at 1000 ° C. for 20 hours in the atmosphere for removing the heat distortion. Then a sample cut-out therefrom was examined with a birefringence measuring device to obtain a value without distortion of 2 nm/cm or less. Further, a stria was not observed visually. The refractive indices of the sample were measured with a 632.8 nm light to seek the difference between the maximum value and the minimum value to obtain a homogeneous value of 2.0×10$^{-6}$/cm or less. Results are shown in Table 1.

A sample was cut out from an ingot applied with a degassing treatment of hydrogen molecules which can completely dissolve in the atmosphere and applied with a surface mirror finish. A glass body of a 10 mm thickness and a 60 mm diameter was produced therefrom. An ArF excimer laser was irradiated to the glass body and the saturated absorbance of the excimer laser light was measured. Results are shown in FIG. 3.

EXAMPLE 2

In the process the same as Example 1 except that the flow rate of the hydrogen gas introduced during the quartz glass ingot growth was 15 Nm³/hr, the oxygen gas flow rate was 6.75 Nm³/hr, and the oxygen/hydrogen flow rate ratio was 0.45, a bar-like quartz glass ingot having a 120 mm diameter and a 400 mm length was produced. The ingot surface was stable without a shape change caused by a dent. The hydrogen molecule concentration at the center part of the obtained ingot was $4.0 \times 10^{18}$ molecular number/cm³. The ingot was applied with a heat treatment at 1000° C. for 20 hours in the atmosphere for removing the heat distortion. The sample was examined with a birefringence measuring device to obtain a value without distortion of 2 nm/cm or less. Further, a stria was not observed visually. The refractive indices of the sample were measured with a 632.8 nm light to seek the difference between the maximum value and the minimum value to obtain a homogeneous value of $2.0 \times 10^{-6}$/cm or less. Results are shown in Table 1.

A sample was cut out from an ingot applied with a degassing treatment of hydrogen molecules which can completely dissolve in the atmosphere and applied with a surface mirror finish. A glass body of a 10 mm thickness and a 60 mm diameter was produced therefrom. An ArF excimer laser was irradiated to the glass body and the saturated absorbance of the excimer laser light was measured. Results are shown in FIG. 3.

Comparative Example 1

In the process the same as Example 1 using silicon tetrachloride (SiCl₄) as the material, a bar-like quartz glass ingot having a 120 mm diameter and a 400 mm length was produced. In the production, conditions such as the combustion gas flow rate and the oxygen gas/the hydrogen gas flow rate ratio were as shown in Table 1. The ingot surface had a shape change by a dent. In order to prevent the generation thereof, it was required to change the position to apply the oxygen-hydrogen flame, and stop the material supply to maintain the shape and resume the supply. Therefore, obvious striae were generated, and also the refractive indices difference was large. A sample was cut out from the obtained bar-like quartz glass ingot and completely degassed. Then it was irradiated with the ArF excimer laser as in Example 1 to measure the saturated absorbance of the excimer laser. As shown in FIG. 3, the value was high.

Comparative Example 2

In the process the same as Comparative Example 1 except that the supply ratio of the combustion gas was as shown in Table 1, a bar-like quartz glass ingot having a 120 mm diameter and a 400 mm length was produced. A sample was cut out from the obtained bar-like quartz glass ingot and completely degassed as in Comparative Example 1. Then the saturated absorbance of the ArF excimer laser was measured. As shown in FIG. 3, the value was high.

Comparative Example 3

In the process the same as Example 1 except that the temperature of the bubbler was set to be 75° C., the material introduction rate was 850 g/hr, and the rotation frequency of the heat resistant substrate was 8 rpm, a bar-like quartz glass ingot was produced as in Example 1. The molar ratio of the material with respect to the hydrogen gas was 0.0118. It was comparatively easy to maintain the shape of the obtained ingot, and silica fine particles grew continuously, however, thin layer-like striae were observed in the growth direction of the ingot. The hydrogen molecule concentration at the center part of the obtained ingot was $3.8 \times 10^{18}$ molecular number/cm³. A sample was cut out from the obtained bar-like quartz glass ingot and completely degassed as in Comparative Example 1. Then the saturated absorbance of the ArF excimer laser was measured. The result shows a curve similar to that of Example 1.

TABLE 1

|  | Example 1 | Example 2 | Comparative Example 1 | Comparative Example 2 | Comparative Example 3 |
| --- | --- | --- | --- | --- | --- |
| Kind of the material | HMDS | HMDS | SiCl₄ | SiCl₄ | HMDS |
| Quartz glass diameter (mm) | 120 | 120 | 120 | 120 | 120 |
| Quartz glass length (mm) | 400 | 400 | 400 | 400 | 400 |
| H₂ gas flow rate (Nm³/hr) | 10 | 15 | 25 | 20 | 10 |
| O₂ gas flow rate (Nm³/hr) | 4.4 | 6.75 | 12 | 9.8 | 4.4 |
| O₂ gas/H₂ gas flow ratio | 0.44 | 0.45 | 0.48 | 0.49 | 0.44 |
| Carrier gas flow rate (Nm³/hr) | 0.18 | 0.18 | 0.4 | 0.4 | 0.3 |
| Material supply amount (g/hr) | 500 | 500 | 1200 | 1200 | 850 |
| Supply mol amount | 3.10 | 3.10 | 7.06 | 7.06 | 5.27 |
| Silica generation amount (mol/hr) | 6.20 | 6.20 | 7.06 | 7.06 | 10.53 |
| Molar ratio of the material with respect to the combustion gas | 0.00694 | 0.00462 | — | — | 0.0118 |
| Target rotation frequency | 30 | 30 | 30 | 30 | 8 |
| Hydrogen molecule concentration (molecular number/cm³) | $4.5 \times 10^{18}$ | $4.0 \times 10^{18}$ | $3.2 \times 10^{18}$ | $3.3 \times 10^{18}$ | $3.8 \times 10^{18}$ |
| Glass growth rate (g/hr) | 167 | 148 | 169 | 177 | 275 |
| Visual observation of striae | None | None | Exist | None | Exist |

TABLE 1-continued

| | Example 1 | Example 2 | Comparative Example 1 | Comparative Example 2 | Comparative Example 3 |
|---|---|---|---|---|---|
| Shape of the quartz glass ingot | Good | Good | Deteriorated | Slightly deteriorated | Slightly deteriorated |
| Homogeneity | Good | Good | Slightly deteriorated | Slightly deteriorated | Slightly poor |
| ArF laser resistance | Good | Good | Poor | Poor | Good |

Note) HMDS is an abbreviation of hexamethyl disilazane.

(Evaluation)

As apparent from FIG. 3, the synthetic quartz glass of Example 1 is saturated at about 1×10⁶ pulse, and the synthetic quartz glass of Example 2 has a saturated absorbance slightly lower than that of the synthetic quartz glass of Example 1. On the other hand, the saturated absorbance in the synthetic quartz glasses of Comparative Examples 1, 2 are more than double as much as that of Example 1. That is, it was learned that the synthetic quartz glasses of Examples have little amount of unordered structures, or the synthetic quartz glasses of Comparative Examples 1, 2 have much unordered structures so as to have a ½ laser resistance.

What is claimed is:

1. A method of producing a synthetic quartz glass for use in excimer lasers, comprising the steps of:

(a) introducing an organodisilazane compound represented by the general formula 1;

$$(R^1)_3SiNHSi(R^2)_3 \quad (1)$$

wherein $R^1$ and $R^2$ represent the same or a different alkyl group having 1 to 3 carbon atoms, into a flame comprising a combustion gas and a combustion-supporting gas to generate silica fine particles;

(b) depositing said silica fine particles onto a rotating heat resistant substrate; and (c) essentially simultaneously with said deposition melting said deposited particles to form an ingot of optical synthetic quartz glass, said glass having a birefringence index of 5 nm/cm or less, a refractive index difference ($\Delta$n) of $2\times10^{-6}$ or less, an ArF saturated absorbance of 0.05/cm or less, and at the same time which has no striae.

2. The method of producing a synthetic quartz glass for excimer lasers according to claim 1, wherein the organodisilazane compound is selected from the group consisting of hexamethyl disilazane, hexaethyl disilazane and hexapropyl disilazane.

3. The method of producing a synthetic quartz glass for excimer lasers according to claim 2, wherein the organodisilazane compound is hexamethyl disilazane.

4. The method of producing a synthetic quartz glass for excimer lasers according to claim 1, wherein the combustion gas is a hydrogen gas, and combustion-supporting gas is an oxygen gas.

5. The method of producing a synthetic quartz glass for excimer lasers according to claim 1, wherein the molar ratio of the introduction amount of the organodisilazane compound with respect to the amount of the combustion gas is 0.01 or less.

6. The method of producing a synthetic quarts glass for excimer lasers according to claim 1, wherein the rotation frequency of the heat resistant substrate is 10 to 150 rpm.

* * * * *